United States Patent
Cho et al.

(10) Patent No.: US 11,941,501 B2
(45) Date of Patent: Mar. 26, 2024

(54) ELECTRONIC APPARATUS AND CONTROL METHOD THEREOF

(71) Applicant: SAMSUNG ELECTRONICS CO., LTD., Suwon-si (KR)

(72) Inventors: Youngrae Cho, Suwon-si (KR); Kiseok Kwon, Suwon-si (KR); Gyeonghoon Kim, Suwon-si (KR); Jaeun Park, Suwon-si (KR)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 1026 days.

(21) Appl. No.: 16/360,188

(22) Filed: Mar. 21, 2019

(65) Prior Publication Data
US 2019/0370692 A1    Dec. 5, 2019

(30) Foreign Application Priority Data

May 30, 2018    (KR) .................. 10-2018-0062058
Oct. 10, 2018    (KR) .................. 10-2018-0120298

(51) Int. Cl.
     *G06N 20/10*      (2019.01)
     *G06F 9/30*      (2018.01)

(52) U.S. Cl.
     CPC ......... *G06N 20/10* (2019.01); *G06F 9/30134* (2013.01)

(58) Field of Classification Search
CPC ...... G06N 20/10; G06N 3/0454; G06N 3/063; G06N 3/00; G06N 5/00; G06N 7/00;
(Continued)

(56) References Cited

U.S. PATENT DOCUMENTS 5,168,375 A * 12/1992 Reisch .................. G06F 17/145
                                                375/E7.241
9,235,874 B2    1/2016 Voronov et al.
(Continued)

FOREIGN PATENT DOCUMENTS

KR    10-2017-0005562 A    1/2017
KR    10-1791573 B1    10/2017
(Continued)

OTHER PUBLICATIONS

He et al., "A Configurable SIMD Architecture with Explicit Datapath for Intelligent Learning," In 2016 International Conference on Embedded Computer Systems: Architectures, Modeling and Simulation (SAMOS) Jul. 1, 20167 (pp. 156-163). IEEE. (Year: 2016).*

(Continued)

*Primary Examiner* — Luis A Sitiriche
(74) *Attorney, Agent, or Firm* — Sughrue Mion, PLLC

(57) ABSTRACT

An electronic apparatus for executing artificial intelligence algorithm is provided. The electronic apparatus includes a memory which stores input data and a plurality of second kernel data obtained from first kernel data, and a processor which obtains upscaled data in which at least a portion of the input data is upscaled by the first kernel data. The data is upscaled by performing a convolution operation on each of the plurality of second kernel data with the input data. Each of the plurality of second kernel data includes a different first kernel element from among a plurality of first kernel elements in the first kernel data.

15 Claims, 25 Drawing Sheets

(58) Field of Classification Search
CPC ........ G06N 10/00; G06N 99/00; G06N 20/00; G06F 9/30134; G06F 17/153; G06F 17/15; G06F 7/5443; G06T 2207/20084; G06T 3/4053
See application file for complete search history.

(56) References Cited

U.S. PATENT DOCUMENTS

| | | | |
|---|---|---|---|
| 9,652,829 | B2 | 5/2017 | Yang et al. |
| 9,836,820 | B2 | 12/2017 | Tuzel et al. |
| 10,025,755 | B2 | 7/2018 | Saber et al. |
| 11,308,361 | B1 * | 4/2022 | Aitken et al. ............ G06K 9/62 |
| 2012/0105658 | A1 | 5/2012 | Ishii et al. |
| 2014/0222778 | A1 | 8/2014 | Nie et al. |
| 2014/0354886 | A1 | 12/2014 | Michaeli et al. |
| 2016/0179434 | A1 | 6/2016 | Herrero Abellanas et al. |
| 2017/0011006 | A1 | 1/2017 | Saber et al. |
| 2017/0287109 | A1 | 10/2017 | Tasfi |
| 2017/0347110 | A1 | 11/2017 | Wang et al. |
| 2018/0122048 | A1 | 5/2018 | Wang et al. |
| 2018/0129935 | A1 | 5/2018 | Kim et al. |
| 2018/0232853 | A1 | 8/2018 | Kim et al. |
| 2019/0073583 | A1 * | 3/2019 | Chen ...................... G06N 3/063 |

FOREIGN PATENT DOCUMENTS

| | | |
|---|---|---|
| KR | 10-1845476 B1 | 4/2018 |
| KR | 10-2018-0052063 A | 5/2018 |

OTHER PUBLICATIONS

Xie, R.Z., "A flexible memory shuffling unit for image processing accelerators," Master's Thesis, Faculty of Electrical Engineering, Eindhoven University of Technology, Nov. 11, 2013. (Year: 2013).*
"A guide to convolution arithmetic for deep learning" Vincent Dumoulin and Francesco Visin (Year: 2018).*
Yang Zhao et al., "GUN: Gradual Upsampling Network for single image super-resolution", IEEE, Mar. 13, 2017, 11 pages.
Communication dated Sep. 6, 2021 issued by the Intellectual Propelty India in application No. 202017044338.
International Search Report (PCT/ISA/210) dated Jul. 11, 2019, issued by the International Searching Authority in International Application No. PCT/KR2019/003719.
Written Opinion (PCT/ISA/237) dated Jul. 11, 2019, issued by the International Searching Authority in International Application No. PCT/KR2019/003719.
Communication dated Mar. 18, 2021 issued by the European Patent Office in application No. 19811501.6.
Yakopcic, C., et al., "Extremely Parallel Memristor Crossbar Architecture for Convolutional Neural Network Implementation", 2017 International Joint Conference on Neural Networks, IEEE, May 14, 2017, XP033112253, pp. 1696-1703.
Lyu, H., "Approaching a collective place definition from street-level images using deep learning methods", Dec. 5, 2018, XP055779156, pp. 1-129 (150 pages).
Hearing Notice dated Jul. 14, 2023 issued by the Indian Patent Office for Indian Patent Application No. 202017044338.
Jia, X., Chang, H., & Tuytelaars, T., "Super-Resolution with Deep Adaptive Image Resampling", arXiv:1712.06463v1, Dec. 18, 2017, 10 pages.
European Extended Search Report dated Oct. 31, 2023 issued by the European Patent Office for EP Patent Application No. 19811501.6.

* cited by examiner

|     |    |    |    |    |    |    |    |    |    |
|-----|----|----|----|----|----|----|----|----|----|
| k0  | 41 | 38 | 0  | 20 | 17 | 0  | 0  | 0  | 0  |
| k1  | 42 | 39 | 36 | 21 | 18 | 15 | 3x3 Kernel | | |
| k2  |    | 40 | 37 |    | 19 | 16 |    |    |    |

|     |    |    |    |    |    |    |    |    |    |
|-----|----|----|----|----|----|----|----|----|----|
| k3  | 48 | 45 |    | 27 | 24 |    | 6  | 3  |    |
| k4  | 49 | 46 | 43 | 28 | 25 | 22 | 7  | 4  | 1  |
| k5  |    | 47 | 44 |    | 46 | 45 |    | 5  | 2  |

|     |    |    |    |    |    |    |    |    |    |
|-----|----|----|----|----|----|----|----|----|----|
| k6  |    |    |    | 34 | 31 |    | 13 | 10 |    |
| k7  |    |    |    | 35 | 32 | 29 | 24 | 11 | 8  |
| k8  |    |    |    |    | 33 | 30 |    | 12 | 9  |

FIG. 3B k0 → | 41 | | 38 | 0

| 20 | | 17 | 0

| 1 | 2 | 3 | 4 | 5 |
|---|---|---|---|---|
| 6 | 7 | 8 | 9 | 10 |
| 11 | 12 | 13 | 14 | 15 |
| 16 | 17 | 18 | 19 | 20 |
| 21 | 22 | 23 | 24 | 25 |

➡

620

| 1 | 2 | 3 | 4 | 5 | 0 |
|---|---|---|---|---|---|
| 6 | 7 | 8 | 9 | 10 | 0 |
| 11 | 12 | 13 | 14 | 15 | 0 |
| 16 | 17 | 18 | 19 | 20 | 0 |
| 21 | 22 | 23 | 24 | 25 | 0 |
| 0 | 0 | 0 | 0 | 0 | 0 |

| 1 | 2 | 3 | 4 | 5 | 0 |
|---|---|---|---|---|---|
| 6 | 7 | 8 | 9 | 10 | 0 |
| 11 | 12 | 13 | 14 | 15 | 0 |
| 16 | 17 | 18 | 19 | 20 | 0 |
| 21 | 22 | 23 | 24 | 25 | 0 |
| 0 | 0 | 0 | 0 | 0 | 0 | k1

| 1 | 2 | 3 | 4 | 5 | 0 |
|---|---|---|---|---|---|
| 6 | 7 | 8 | 9 | 10 | 0 |
| 11 | 12 | 13 | 14 | 15 | 0 |
| 16 | 17 | 18 | 19 | 20 | 0 |
| 21 | 22 | 23 | 24 | 25 | 0 |
| 0 | 0 | 0 | 0 | 0 | 0 | k2

| 1 | 2 | 3 | 4 | 5 | 0 |
|---|---|---|---|---|---|
| 6 | 7 | 8 | 9 | 10 | 0 |
| 11 | 12 | 13 | 14 | 15 | 0 |
| 16 | 17 | 18 | 19 | 20 | 0 |
| 21 | 22 | 23 | 24 | 25 | 0 |
| 0 | 0 | 0 | 0 | 0 | 0 | k3

| 1 | 2 | 3 | 4 | 5 | 0 |
|---|---|---|---|---|---|
| 6 | 7 | 8 | 9 | 10 | 0 |
| 11 | 12 | 13 | 14 | 15 | 0 |
| 16 | 17 | 18 | 19 | 20 | 0 |
| 21 | 22 | 23 | 24 | 25 | 0 |
| 0 | 0 | 0 | 0 | 0 | 0 |

FIG. 7B

ELECTRONIC APPARATUS AND CONTROL METHOD THEREOF

CROSS-REFERENCE TO RELATED APPLICATIONS

This application claims priority from Korean Patent Application No. 10-2018-0120298, filed on Oct. 10, 2018 and Korean Patent Application No. 10-2018-0062058, filed on May 30, 2018, in the Korean Intellectual Property Office, the disclosures of which are incorporated herein by reference in their entireties.

BACKGROUND

1. Field

The disclosure relates to an electronic apparatus and a controlling method thereof, and more particularly, to an electronic apparatus upscaling input data based on kernel data and a controlling method thereof.

2. Description of Related Art

An artificial intelligence (AI) system is a system which implements human-level intelligence, in which the machine trains itself, judges and becomes smart, unlike a conventional rule-based smart system. The more the artificial intelligence system is used, the higher the recognition rate and the better understanding of a user preference. Therefore, the conventional rule-based smart system has been replaced by a deep-learning based artificial intelligence system.

The artificial intelligence technology consists of machine learning (e.g., deep-learning) and element technologies that use the machine learning.

Machine learning is an algorithm technology that classifies/trains the characteristics of input data by itself. The element technology is a technology that uses a machine learning algorithm such as deep-learning and includes linguistic understanding, visual understanding, reasoning/prediction, knowledge representation, motion control, etc.

The artificial intelligence technology may be applied to various fields, examples of which are described below. Linguistic understanding is a technology for recognizing and applying/processing human language/characters, including natural language processing, machine translation, dialogue system, query response, speech recognition/synthesis, and the like. Visual comprehension is a technology for recognizing and processing an object as if it was perceived by a human being, including object recognition, object tracking, image search, human recognition, scene understanding, spatial understanding, image enhancement, etc. Inference prediction is a technology for judging, logically inferring and predicting information, including knowledge/probability based reasoning, optimization prediction, preference base planning, and recommendation. Knowledge representation is a technology for automating human experience information into knowledge data, including knowledge building (data generation/classification) and knowledge management (data utilization). The motion control is a technology for controlling the autonomous travel of a vehicle and the motion of a robot, including motion control (navigation, crash and traveling), operation control (behavior control), and the like.

Particularly, a neural network that increases a resolution of an input image, which is referred to as a super resolution, consists of a convolution layer for extracting the feature of an image, a non-linear layer (ReLu, Pooling, Elementwise sum, Batch normalization, etc.) for calculating the extracted feature, and an upscale layer for doubling the resolution of the input image.

The upscale layer may be formed in various manners using, for example, bilinear, subpixel shuffle, transposed convolution, Gaussian filter, etc. However, an additional upscaling layer that could be formed using the above-described methods may increase a hardware area.

Accordingly, a method is needed for maintaining the hardware area small while performing an upscaling operation.

Recently, a high-resolution image service, and a real-time streaming service are in high demand. However, compression loss is inevitable for transmitting a high resolution image and a streaming image, which results in an image quality deterioration.

The above information is presented as background information only to assist with an understanding of the present disclosure. No determination has been made, and no assertion is made, as to whether any of the above might be applicable as prior art with regard to the present disclosure.

SUMMARY

Embodiments of the disclosure relate to providing an electronic apparatus having a reduced hardware area by eliminating hardware for performing a specific operation and a controlling method thereof.

According to an aspect of the disclosure, there is provided an electronic apparatus having a storage configured to store input data and a plurality of second kernel data obtained from first kernel data; and a processor configured to acquire data in which a part of the input data is upscaled by the first kernel data by performing a convolution operation on each of the plurality of second kernel data with the input data. Each of the plurality of second kernel data includes a different first kernel element of a plurality of first kernel elements in the first kernel data.

Each of the plurality of second kernel data may be obtained from an expanded first kernel data based on a plurality of first kernel elements spaced apart at intervals of a multiple (r) of the upscaling. The expanded first kernel data is obtained by expanding the first kernel data based on a size of the first kernel data and the multiple (r).

The electronic apparatus may further include a communicator including circuitry. The processor is further configured to receive the plurality of second kernel data from a server through the communicator, and store the received plurality of second kernel data in the storage.

The electronic apparatus may further include a communicator including circuitry. The processor is further configured to receive the first kernel data from a server through the communicator, obtain the plurality of second kernel data from the first kernel data, and store the plurality of second kernel data in the storage.

The processor may further be configured to perform the convolution operation on each of the plurality of second kernel data with an element to be upscaled and a plurality of peripheral elements that surround the element to be upscaled in the part of the input data to obtain a plurality of upscaling elements with respect to the element to be upscaled. A sum of the element to be upscaled and the plurality of peripheral elements is the same as a sum of a plurality of second elements respectively included in the plurality of second kernel data.

The processor may further be configured to determine positions of the plurality of upscaling elements with respect to the upscaled data based on a position of the element to be upscaled with respect to the input data.

The processor may include a convolution array including circuitry and configured to perform the convolution operation on each of the plurality of second kernel data with the input data, and a line memory including circuitry and configured to store the up scaled data.

The convolution array may include a plurality of processing elements respectively including a plurality of register files. Each of the plurality of processing elements performs a multiplying operation by using a second kernel element input to the plurality of processing elements of the plurality of second kernel data, and accumulates and stores a result of the multiplying operation in a register file corresponding to the second kernel element of the plurality of register files.

The processor may further include a shuffler including circuitry and disposed between the convolution array and the line memory. The shuffler shuffles a plurality of operation results output from the plurality of processing elements and provides the shuffled plurality of operation results to the line memory.

The shuffler may further include a plurality of buffer sets including circuitry, and a FIFO memory including circuitry and configured to receive a plurality of processing elements output from corresponding register files included in the plurality of processing elements, and output the plurality of operation results to the plurality of buffer sets. The plurality of buffer sets store each of the plurality of operation results in a buffer corresponding to each of the plurality of buffer sets, and based on the plurality of operation results being stored in all buffers included in the plurality of buffer sets, provide the plurality of processing elements stored in one of the plurality of buffer sets to the line memory in a pre-set order.

According to an aspect of the disclosure, there is provided an electronic system including a server configured to obtain a plurality of second kernel data including different first kernel elements of a plurality of first kernel elements in first kernel data, and an electronic apparatus configured to receive the second kernel data from the server, acquire data in which a part of input data is upscaled by the first kernel data by performing a convolution operation on each of the plurality of second kernel data with input data.

The server may expand the first kernel data based on a size of the first kernel data and a multiple (r) of the upscaling, and obtain each of the plurality of second kernel data based on a plurality of first kernel elements spaced apart at intervals of the multiple (r) in the expanded first kernel data.

According to an aspect of the disclosure, there is provided a method of controlling an electronic apparatus. The method includes performing a convolution operation on each of a plurality of second kernel data obtained from first kernel data with input data, and acquiring data in which a part of the input data is upscaled by the first kernel data based on the convolution operation.

Each of the plurality of second kernel data may be obtained from an expanded first kernel data based on a plurality of first kernel elements spaced apart at intervals of a multiple (r) of the upscaling. The expanded first kernel data is obtained by expanding the first kernel data based on a size of the first kernel data and the multiple (r).

The method may further include receiving the plurality of second kernel data from a server.

The method may further include receiving the first kernel data from a server, and obtaining the plurality of second kernel data from the first kernel data.

The obtaining of the upscaled data may further include performing the convolution operation on each of the plurality of second kernel data with an element to be upscaled and a plurality of peripheral elements that surround the element to be upscaled in a part of the input data, and obtaining a plurality of upscaling elements with respect to the element to be upscaled. A sum of the element to be upscaled and the plurality of peripheral elements is the same as a sum of a plurality of second elements included in the plurality of second kernel data.

The obtaining of the upscaled data may include determining positions of the plurality of upscaling elements with respect to the upscaled data based on a position of the element to be upscaled with respect to the input data.

The acquiring of the upscaled data may include performing the convolution operation on each of the plurality of second kernel data with the input data through a convolution array, and storing the upscaled data in a line memory.

The convolution array may include a plurality of processing elements respectively including a plurality of register files. The performing of the convolution operation includes performing a multiplying operation by using a second kernel element input to the plurality of processing elements of the plurality of second kernel data through each of the plurality of processing elements, and accumulating and storing the plurality of operation results in a register file corresponding to the second kernel element among the plurality of register files.

According to the above-described various aspects, an electronic apparatus performs an upscaling operation through a convolution array, and eliminates additional hardware for performing an upscaling operation, thereby reducing a hardware area.

BRIEF DESCRIPTION OF THE DRAWINGS

The above and other aspects, features, and advantages of certain embodiments of the present disclosure will be more apparent from the following description takin in conjunction with the accompanying drawings, in which:

FIGS. 2A to 2C are views illustrating a method of obtaining a plurality of second kernel data according to an embodiment;

FIGS. 3A to 3B are views illustrating second kernel data according to an embodiment;

FIGS. 6A and 6C are views illustrating a method of obtaining a plurality of second kernel data according to an embodiment;

FIGS. 7A to 7C are views illustrating a method of obtaining a plurality of second kernel data according to another embodiment;

DETAILED DESCRIPTION

Figure 1:
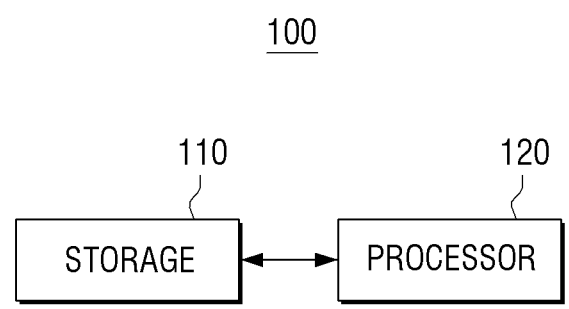
FIG. 1 is a block diagram illustrating a configuration an electronic apparatus according to an embodiment.

Embodiments may be diversely modified. Accordingly, specific embodiments are illustrated in the drawings and are described in detail in the detailed description. However, it is to be understood that the present disclosure is not limited to a specific embodiment, but includes all modifications, equivalents, and substitutions without departing from the scope and spirit of the present disclosure. Also, well-known functions or constructions are not described in detail since they would obscure the disclosure with unnecessary detail.

Hereinafter, various embodiments will be described in detail with reference to the accompanying drawings.

FIG. 1 is a block diagram illustrating a configuration an electronic apparatus according to an embodiment. Referring to FIG. 1, an electronic apparatus 100 may include a storage 110 such as a memory and a processor 120.

The electronic apparatus 100 may upscale a part of input data based on kernel data. For example, the electronic apparatus 100 may upscale content to correspond to a resolution of a display apparatus, and provide the upscaled content to the display apparatus such as a set-top box (STB), a server, etc. The electronic apparatus 100 may include a display and upscale a content to correspond to a resolution of the display, such as a desktop PC, a notebook, a smartphone, a tablet PC, etc. However, the present disclosure is not limited thereto, the electronic apparatus 100 could be any type of apparatus as long as it is capable of performing an upscaling operation.

The storage 110 may be separately provided from the processor 120, and embodied as a hard disk, a non-volatile memory, a volatile memory, etc.

The storage 110 may store input data. The input data may include data that is subject to up-scaling. The storage 110 may store a part of the input data. The input data may include data to be upscaled, or the input data may be data obtained by padding the data to be upscaled by the processor 120. For ease of explanation, it will be assumed that the input data includes the data to be upscaled and the padded data. However, the present disclosure is not limited thereto. The input data may include only the data to be upscaled. The processor 120 may pad the data to be upscaled and store the padded data in the storage 110.

The storage 110 may store a plurality of second kernel data obtained from first kernel data. The first kernel data may be data for upscaling the part of the input data. For example, the first kernel data may be a Gaussian filter for upscaling the part of the input data. Each of the plurality of second kernel data may include a different first kernel element among a plurality of first kernel elements included in the first kernel data.

The electronic apparatus 100 may receive a plurality of second kernel data from a server. The server may obtain the plurality of second kernel data from the first kernel data and transmit the plurality of second kernel data to the electronic apparatus 100. The electronic apparatus 100 may receive the first kernel data from the server, and directly obtain the plurality of second kernel data from the first kernel data.

The storage 110 may include a larger storage capacity than a line memory provided in the processor 120, and provide data to the line memory, or receive data from the line memory.

For example, the input data and the first kernel data stored in the storage 110 may be temporarily stored in the line memory. The input data and the first kernel data stored in the storage 110 may be partly stored in the line memory. The upscaled data may be stored in the line memory, and the storage 110 may receive the upscaled data from the line memory.

The processor 120 may control the overall operation of the electronic apparatus 100.

The processor 120 may acquire data in which a part of the input data is upscaled by the first kernel data by performing a convolution operation on each of the plurality of second kernel data with the input data.

The plurality of second kernel data may be obtained from the first kernel data. Each of the plurality of second kernel data may include a different first kernel element of the plurality of first kernel elements included in the first kernel data.

Each of the plurality of second kernel data may be obtained from an expanded first kernel data based on a plurality of first kernel elements spaced apart at the interval of a multiple (r) of the upscaling. The expanded first kernel data is obtained by expanding the first kernel data based on a size of the first kernel data and the multiple (r).

For example, when the first kernel data is in a 7×7 matrix formation, nine of second kernel data in a 3×3 matrix formation may be obtained from the first kernel data. The size of each of the plurality of second kernel data may be determined based on the size of the first kernel data. In addition, the number of the plurality of second kernel data may be determined based on the multiple (r) of upscaling. The method for obtaining the plurality of second kernel data will be described in further detail below.

The electronic apparatus 100 may further include a communicator (not shown), and the processor 120 may receive a plurality of second kernel data from a server through the communicator, and store the plurality of received second kernel data in the storage 110.

The processor 120 may further receive the first kernel data from the server through the communicator, obtain the plurality of second kernel data from the first kernel data, and store the plurality of second kernel data in the storage 110.

The communicator may be configured to perform communication with various types of external apparatuses using various types of communication methods. The communicator may include a Wi-Fi chip, a Bluetooth chip, a wireless communication chip, an NFC chip, or the like. The processor 120 may perform communication with various types of external apparatuses using the communicator.

The Wi-Fi chip or the Bluetooth chip may perform communication using a Wi-Fi method, and a Bluetooth method, respectively. When the Wi-Fi chip or the Bluetooth chip is used, various connectivity information such as an SSID and a session key may be first transmitted and received. A communication connection may be established based on the connectivity information, and various information may be transmitted and received in the established communication connection. The wireless communication chip refers to a chip that performs communication according to various communication standards such as IEEE, ZigBee, 3rd Generation (3G), 3rd Generation Partnership Project (3GPP), Long Term Evolution (LTE), etc. The NFC chip refers to a chip operating in an NFC (Near Field Communication) mode using 13.56 MHz band among various RF-ID frequency bands such as 135 kHz, 13.56 MHz, 433 MHz, 860 to 960 MHz and 2.45 GHz.

The communicator may perform unidirectional communication or bidirectional communication with an external apparatus. When performing the unidirectional communication, the communicator may receive first kernel data or a plurality of second kernel data from the external apparatus. When performing the bidirectional communication, the communicator may receive the first kernel data or the plurality of second kernel data from the external apparatus, or transmit the upscaled data to the external apparatus.

The processor 120 may perform a convolution operation on each of the plurality of second kernel data with an element to be upscaled and a plurality of peripheral elements surrounding the element to be upscaled in a part of the input data to obtain a plurality of upscaling elements with respect to the element to be upscaled. The sum of the elements to be upscaled and the plurality of peripheral elements may be the same as the sum of the plurality of second elements respectively included in the plurality of second kernel data.

For example, when the element to be upscaled and the plurality of peripheral elements surrounding the element to be upscaled are in a 3×3 matrix formation, and each of the plurality of second kernel data is in a 3×3 matrix formation, the processor 120 may perform a convolution operation on the element to be upscaled and the plurality of peripheral elements surrounding the element to be upscaled with one of the plurality of second kernel data to obtain one upscaling element. The processor 120 may perform the operation on the remainder of the plurality of second kernel data in the same manner. In other words, the number of the plurality of upscaling elements may be the same as the number of the plurality of second kernel data.

The upscaled data may be in a matrix formation, and the processor 120 may determine the positon of the upscaling element based on the second kernel data used in the convolution operation. For example, the processor 120, when the first one of the plurality of second kernel data is used for the operation, the upscaling element by the operation of the first second kernel data may be disposed in the first row and the first column of the upscaled data, and when the second one of the plurality of second kernel data is used for the operation, the upscaling element by the operation of the second one may be disposed in the first row and the second column of the upscaled data.

As described above, according to an embodiment, the processor 120 may obtain the upscaled data for the element to be upscaled. For example, the processor 120 may convert the element to be upscaled, which is one pixel value, into the upscaled data having 3×3 pixel values.

The processor 120 may determine the positions of the plurality of upscaling elements with respect to the upscaled data based on the position of the element to be upscaled for the input data.

For example, the processor 120 may convert a first upscaling object element, which is one pixel value included in the input data, into the upscaled first data having 3×3 pixel values. The processor 120, when the first upscaling object element of the plurality of upscaling object elements of the input data is disposed at the top leftmost end, the processor 120 may arrange the first upscaled data at the top leftmost end of the upscaled data.

The processor 120 may determine the positions of the plurality of upscaling elements with respect to the upscaled data based on the relative positions of the upscaling object elements.

For example, the processor 120 may convert the first upscaling object element, which is one pixel value included in the input data, into the first upscaled data having 3×3 pixel values, and convert a second upscaling object element, which is one pixel value included in the input data, into the second upscaled data having 3×3 pixel values. The processor 120, when the second upscaling object element is disposed on the right side of the first upscaling object element, may arrange the second upscaled data on the right side of the first upscaled data.

The processor 120 may include a convolution array for performing a convolution operation on each of the plurality of second kernel data with input data and a line memory for storing upscaled data.

The convolution array may include a plurality of processing elements, each having a plurality of register files, and each of the plurality of processing elements may perform a multiplying operation by using a second kernel element input to the plurality of processing elements among the plurality of second kernel data, and accumulate and store the operation result in the register file corresponding to the second kernel element among the plurality of register files.

The processor 120 may further include a shuffler disposed between the convolution array and the line memory, and the shuffler may shuffle a plurality of operation results output from the plurality of processing elements and provide the result to the line memory.

The shuffler may receive a plurality of operation results output from the register files included in a plurality of buffer sets and a plurality of corresponding processing elements include a FIFO memory that outputs the plurality of operation results to the plurality of buffer sets. The plurality of buffer sets may store each of the plurality of operation results in a buffer corresponding to each of the plurality of buffer sets, and when the operation results are stored in all of the buffers included in the plurality of buffer sets, the plurality of operation results stored in one of the plurality of buffer sets may be provided to the line memory in a preset order.

The electronic apparatus 100 may upscale input data by using a convolution array without additional dedicated hardware.

Hereinafter, the operation of the processor 120 will be described in further detail with reference to the drawings, according to an embodiment.

Figure 2A:
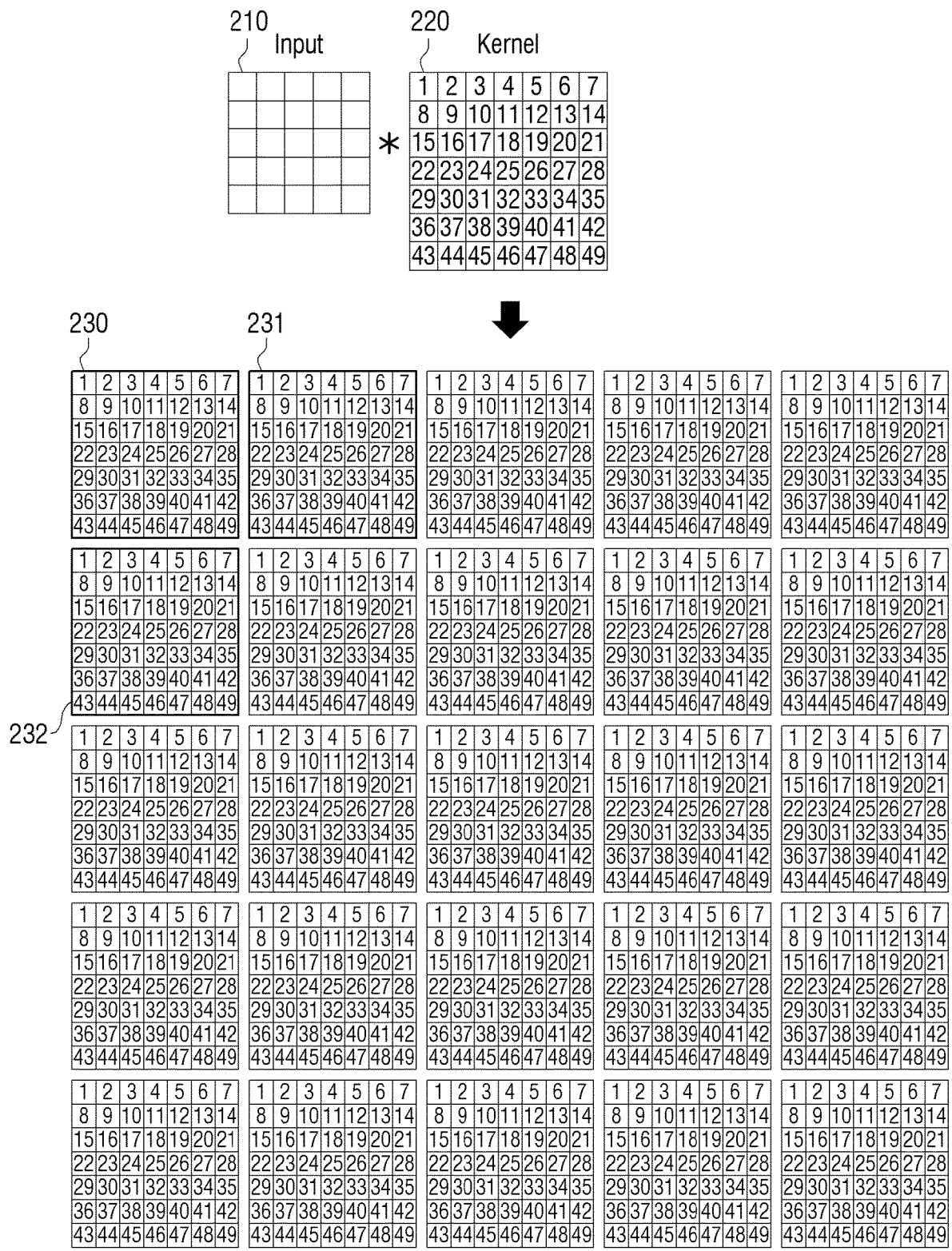
Figure 2B:
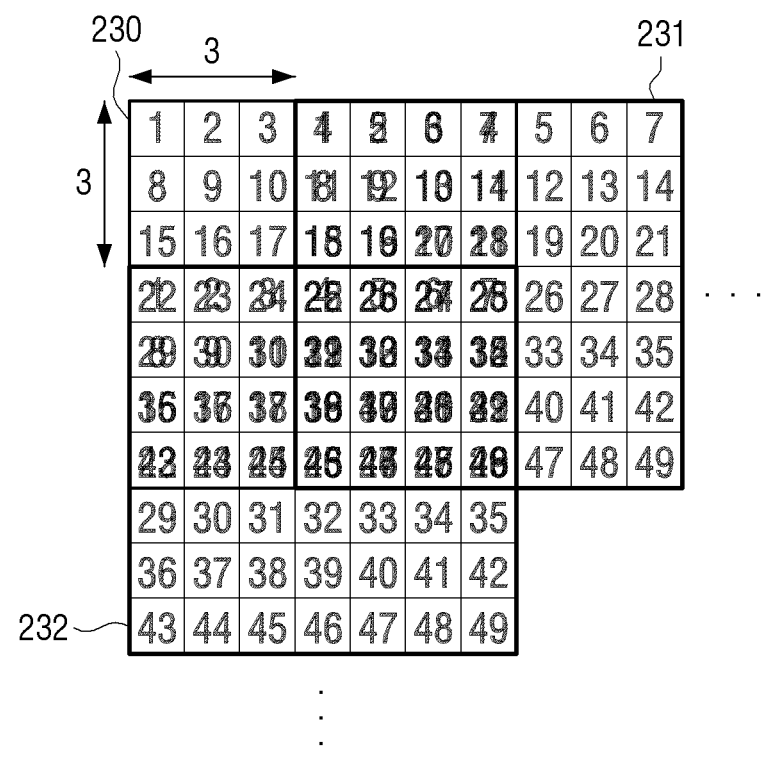
Figure 2C:
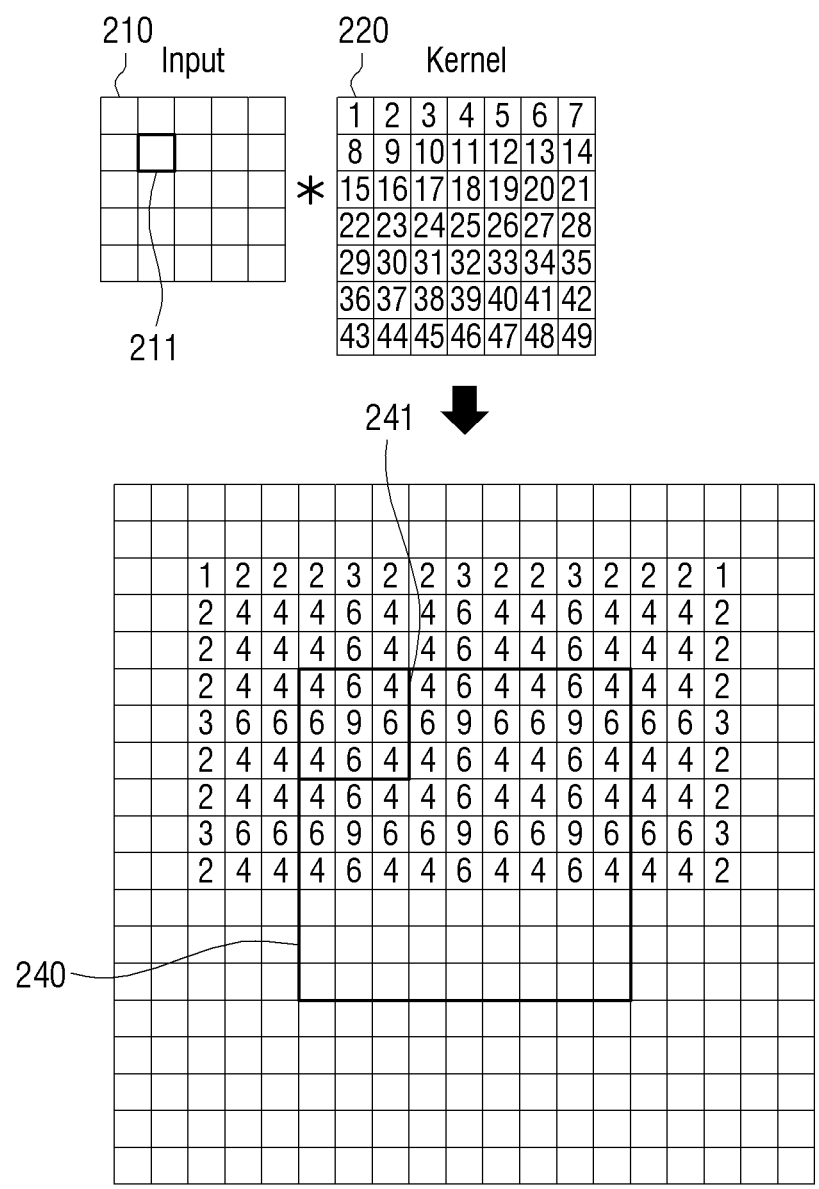

FIGS. 2A to 2C are views illustrating a method of obtaining a plurality of second kernel data according to an embodiment. It will be assumed that the server, not the electronic apparatus 100, obtains a plurality of second kernel data.

Referring to FIG. 2A, the server may multiply each of 25 elements of the input data 210 of 5×5 by 49 elements in first kernel data 220 of 7×7 to obtain a plurality of intermediate data.

For example, the server may obtain first intermediate data 230 by multiplying the element in the first row and the first column of the input data 210 by 49 elements included in the first kernel data 220, second intermediate data 231 by multiplying the element in the first row and the second column of the input data 210 by 49 elements in the first kernel data 220, and third intermediate data 232 by multiplying the element in the second row and the first column by 49 elements in the first kernel data 220. In such a manner, the server may obtain a plurality of intermediate data 230 on the right side of FIG. 2A.

The server may arrange the plurality of intermediate data at predetermined intervals, and further include overlapping portions. For example, referring to FIG. 2B, the server may arrange the second intermediate data 231 to the right from the first intermediate data 230 by three spaces, and arrange the third intermediate data 232 downwardly from the first intermediate data 230 by three spaces. In such a manner, the server may overlap and arrange the plurality of intermediate data. The distances to the left and right or the up and down sides between the neighboring intermediate data may all be the same.

FIG. 2C is a view illustrating a number of overlaps for each area when the plurality of intermediate data is overlapped in the same manner as FIG. 2B, according to an embodiment. For ease of explanation, the number of overlaps of some areas will be omitted.

A center area 240 of 9×9 of the overlapping areas of FIG. 2C may be used as upscaled data, and the area to be upscaled may be a right center area of 3×3 in the input data 210. In other words, when the right center area of 3×3 in the input data 210 is the data to be upscaled, and the element surrounding the data to be upscaled is padded, the right center area of 3×3 in the input data 210 may be upscaled to the center area 240 of 9×9 through the processes shown in FIGS. 2A to 2C.

A first element 211 in the right center area of 3×3 in the input data 210 may be upscaled to a sub-area 241 of 3×3 on the top left side in the center area 240 of 9×9. The element in the right center area of 3×3 in the input data 210 may be upscaled to the sub-area of 3×3, and each sub-area may be disposed in the center area 240 of 9×9 according to the position of the corresponding element.

Each of nine sub-areas may have the same number of operations depending on the position of the element. To be specific, the number of overlaps of the first row and the first column of the sub-area 241 on the top left side may be 4 (four), and the number of overlaps of the first row and the first column of the remaining sub-area may also be 4 (four). Four of first kernel elements of the first kernel data 220 for generating the first row and the first column of the sub-area 241 on the top left side may be the same as four of first kernel elements of the first kernel data 220 for generating the first row and the first column of the remaining sub-area. In this case, the same four first kernel elements may be used, but the position of the sub-area may be determined according to the position of the element of the input data to be operated with the four first kernel elements. The server may obtain one of the plurality of second kernel data by using four first kernel elements.

The number of overlaps of the first row and the second column of each sub-area may be 6 (six), and six kernel elements may be used. The server may obtain another one of the plurality of second kernel data by using six first kernel elements.

Based on such regularity, the server may obtain the plurality of second kernel data from the first kernel data. Since the sub-area includes nine elements, the plurality of second kernel data may be nine.

The server may identify which area of the input data 210 the plurality of second kernel data is operated with, and further detailed description thereof will be made with reference to FIGS. 4A and 4B.

Figure 3B:
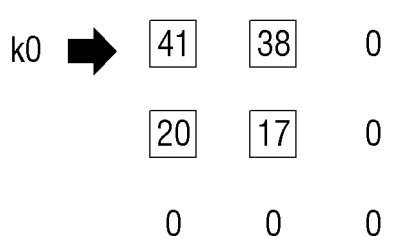

FIGS. 3A to 3B are views illustrating second kernel data according to an embodiment.

In the same manner as shown in FIG. 2C, the server may generate second kernel data for each element in the sub-area. To be specific, the server may divide the plurality of first kernel elements in the first kernel data into a plurality of groups, and add 0 (zero) to each of the plurality of groups to have a predetermined number of elements to obtain a plurality of second kernel data. Since the number of elements in the sub-area is 9 (nine), referring to FIG. 3A, the server may generate nine of second kernel data of k0, k1, . . . , and k8.

For example, when the first kernel data is in a 7×7 matrix formation, the server may divide 49 first kernel elements in the first kernel data into 9 groups of 4, 6, 4, 6, 9, 6, 4, 6 and 4. The server may add 5, 3, 5, 3, 0, 3, 5, 3 and 5 zeros to each of nine groups so that each group becomes 9 (nine).

The second kernel data may be in a matrix formation, and the server may determine the positon where 0 is to be added in the corresponding second kernel data based on at least one first kernel element in each of the plurality of groups.

Referring to FIG. 3A, the number in nine of second kernel data refers to the first kernel element in the first kernel data 220. For example, the second kernel data of k0 may include the first kernel elements of 17, 20, 38 and 41 in the first kernel data 220, and the remaining area may be 0 (zero).

Referring to FIG. 3B, the server may generate the second kernel data of k0 in a 3×3 matrix formation. The remaining second kernel data of FIG. 3 may be generated in a 3×3 matrix formation similarly.

Figure 4A:
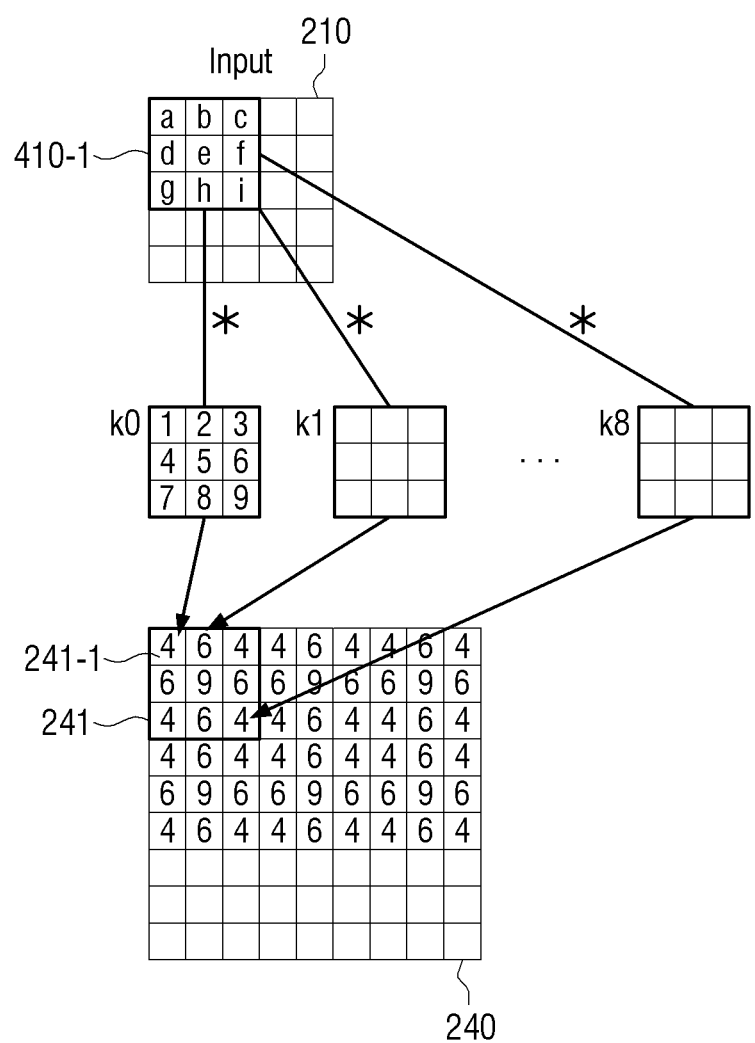
FIGS. 4A and 4B are views illustrating an operation of a processor according to a relationship between input data and upscaled data according to an embodiment.
Figure 4B:
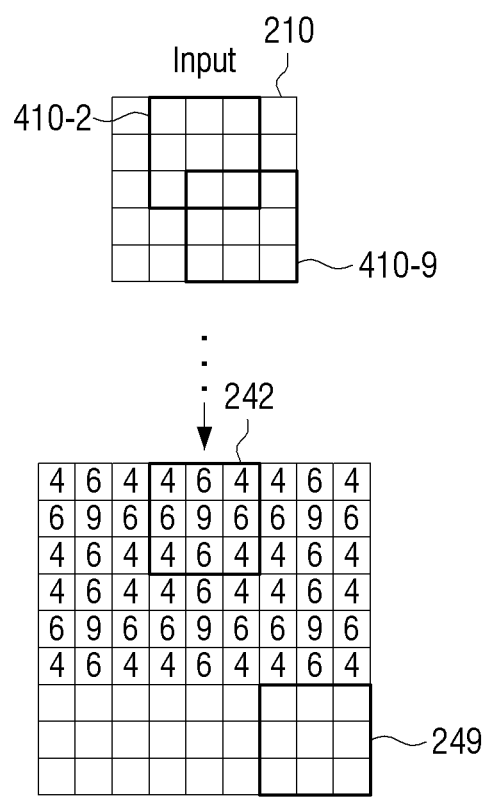

FIGS. 4A and 4B are views illustrating an operation of a processor according to a relationship between input data and upscaled data according to an embodiment.

The server may identify how the element in the center area 240 of 9×9 is generated when the plurality of intermediate data is overlapped, as shown in FIG. 2B, according to an embodiment.

For example, the server may identify that a convolution operation is performed between the first area 410-1 of the input data 210 and the second kernel data of k0 to generate an element 241-1 in the sub-area 241 of the center area 240 of 9×9.

The convolution operation between the first area 410-1 of the input data 210 and the second kernel data of k0 is as follow.

$$1 \times a + 2 \times b + 3 \times c + 4 \times d + 5 \times e + 6 \times f + 7 \times g + 8 \times h + 9 \times i$$

The above equation is a general expression for explaining the convolution operation. Since the second kernel data of k0 is shown in FIG. 3B, the above equation can be expressed as follows.

$$(41) \times a + (38) \times b + 0 \times c + (20) \times d + (17) \times e + 0 \times f + 0 \times g + 0 \times h + 0 \times i = (41) \times a + (38) \times b + (20) \times d + (17) \times e$$

The server may identify that a convolution operation may be performed between the first area 410-1 of the input data 210 and the second kernel data of k1, and the element 241-1 on the right side may be obtained in the sub-area 241 of the center area 240 of 9×9. The server may identify that a convolution operation is performed between the first area 410-1 of the input data 210 and the second kernel data of k8, and the element on the right bottom may be obtained in the sub-area 241 of the center area 240 of 9×9.

The server may identify that one sub-area may be obtained according to the convolution operation between one area of the input data and each of the plurality of second kernel data.

The server may identify that another sub-area may be obtained in the center area 240 of 9×9 as one area of the input data is changed.

For example, referring to FIG. 4B, the server may identify that the sub-area 242 may be obtained according to the convolution operation between the second area 410-2 of the input data 210 and each of the plurality of second kernel data, and the sub-area 249 may be obtained according to the convolution operation between the ninth area 410-9 of the input data 210 and each of the plurality of second kernel data.

The input data 210 may have nine areas of 3×3, and nine of the sub-areas may be obtained accordingly.

The server may execute a method of obtaining the center area 240 of 9×9 (FIG. 4A) from the input data 210 and the first kernel data 220 (FIG. 2C).

The electronic apparatus 100 may receive an upscaling method from the server, and store the upscaling method in the storage 110. The upscaling method may be embodied as a partial configuration of the processor 120 in a hardware format, or stored in a line memory in the processor 120.

The processor 120 may perform a convolution operation between each of the plurality of second kernel data and input data according to the upscaling method and acquire the data obtained by upscaling the part of the input data by the first kernel data.

Referring to FIGS. 4A and 4B, the processor 120 may perform a convolution operation between one area of the input data 210 and the plurality of second kernel data to obtain the center area 240 of 9×9, which is obtained by upscaling the input data 210. FIGS. 2A to 4B show an embodiment where the second kernel data in a 3×3 matrix formation is obtained when the first kernel data is in a 7×7 matrix formation. FIGS. 2A to 4B illustrate a method of obtaining the second kernel data from the result of a Gaussian filter according to an embodiment. FIGS. 5A to 7C show a more general method of acquiring a plurality of second kernel data from first kernel data.

It will be assumed that the first kernel data in a k×k matrix formation and the upscaling multiple (r) are input by a user.

Figure 5:
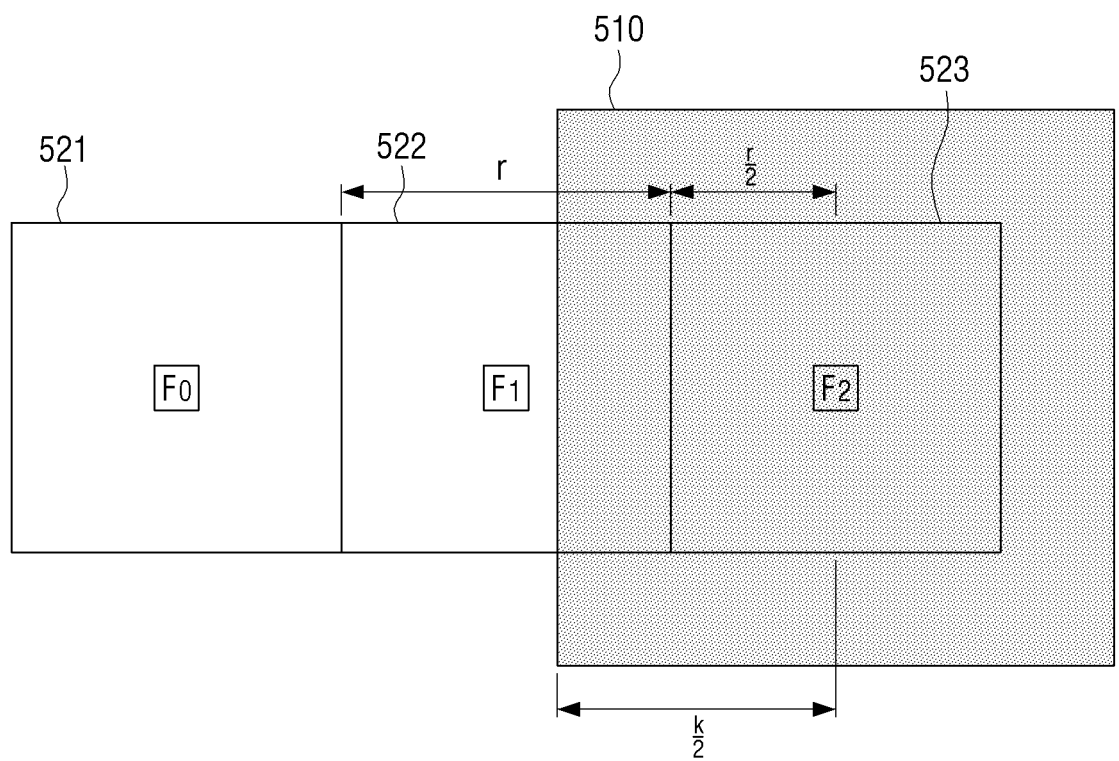
FIG. 5 is a view illustrating a method of identifying the size of second kernel data according to an embodiment.

FIG. 5 is a view illustrating a method for identifying the size of second kernel data according to an embodiment. It will be assumed that the first kernel data in a k×k matrix formation and the upscaling multiple (r) are input by a user.

Referring to FIG. 5, F0, F1, and F2 denote one pixel, and may be a pixel to be upscaled. FIG. 5 shows data 521, 522, and 523 that are upscaled from F0, F1, and F2 first kernel data 510 by a multiple (r).

The relationship with the pixel affected by the first kernel data 510 may be the size of the second kernel data. Referring to FIG. 5, the second kernel data affecting up to F1 based on F2 pixel may be in 3×3 matrix formation, and the first kernel data 510 may range between r+2 and r+r/2. That is, the size of the first kernel data 510 may be expressed as follow.

$r<k<=3r$

Referring to FIG. 5, the second kernel data that affects up to F0 based on the F2 pixel may be in a 5×5 matrix formation, and the first kernel data 510 may range from r+r/ to 2r+r/2. That is, the size of the first kernel data 510 may be expressed as follow.

$3r<k<=5r$

In the same manner, when the second kernel data is in a 7×7 matrix formation, the size of the first kernel data 510 will be as follow.

$5r<k<=7r$

When the user inputs the first kernel data and the upscaling multiple (r), the server may obtain the size of the second kernel data based on the size of the first kernel data and the upscaling multiple (r).

For example, when the user inputs the first kernel data in a 7×7 matrix formation, and the upscaling multiple 3, the first equation may be satisfied (3<7<=9), the size of the second kernel data may be 3×3. When the user inputs the first kernel data in a 7×7 matrix formation, and the upscaling multiple 2, the second equation may be satisfied (6<7<=10), and the size of the second kernel data may be 5×5.

Figure 6C:
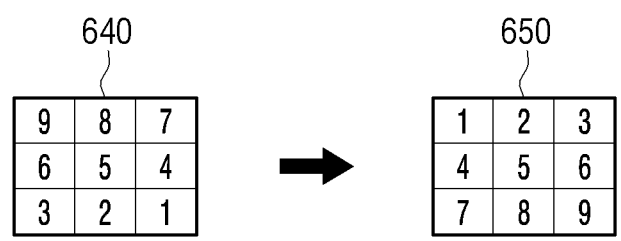

FIGS. 6A and 6C are views illustrating a method of obtaining a plurality of second kernel data according to an embodiment. Referring to the left matrix of FIG. 6A, it will be assumed that the first kernel data 610 in a 5×5 matrix formation and the upscaling multiple (r) 2 are applied.

Referring to FIG. 6A, the server may expand the first kernel data 610. The server may expand the first kernel data 610 based on the size of the second kernel data and the upscaling multiple (r). The size of the second kernel data may be obtained as shown in FIG. 5, and based on the first equation of FIG. 5 (2<5<=6), the size of the second kernel data may be 3×3.

The server may determine the size of the first kernel data by multiplying the size of the second kernel data by the upscaling multiple. For example, the server may determine the size of the first kernel data to be 6×6 by multiplying the size of the second kernel data 3 by the upscaling multiple 2.

The server may obtain the expanded first kernel data 620 of 6×6 by performing a zero padding to the right side and to the bottom side of the first kernel data of 5×5. However, the disclosure is not limited thereto, and the server may obtain the expanded first kernel data of 6×6 by performing a zero padding to the left side and to the top of the first kernel data of 5×5. Hereinafter, for convenience of explanation, it will be assumed that the right side and the bottom side of the first kernel data are zero-padded.

Referring to FIG. 6B, the sever may obtain each of the plurality of second kernel data based on the plurality of first kernel elements which are spaced apart at intervals of the upscaling multiple (r).

For example, the server may obtain k0 of the second kernel data 630 based on 1, 3, 5, 11, 13, 15, 21, 23, and 25 of the first kernel data 610. The server may obtain k1 of the second kernel data 630 based on 2, 4, 12, 14, 22, and 24 of the first kernel data 610. The server may add 0 to obtain the second kernel data of 3×3. Each of the plurality of second kernel data 630 may include a different first kernel element of a plurality of first kernel elements in the first kernel data 610.

The server may identify each of the plurality of second kernel data as two-dimensional information of (i, j) (i and j are natural numbers smaller than or equal to the multiple of upscaling (r)), and the size of the second kernel data based on the size of the first kernel data and the multiple (r), expand the first kernel data based on the size of the second kernel data and the multiple (r), and obtain second kernel data of (i, j) of the plurality of second kernel data based on the first kernel element located in the row of (r×a+i) and the column of (r×b+j) in the expanded first kernel data. Here, a and b may be natural numbers of 0 or more, respectively.

Referring to FIG. 6C, the server may acquire each of the plurality of second kernel elements 650 by changing the arrangement of the first kernel element 640. That is, the server may sequentially arrange the first kernel elements 640 located in the (r×a+i) row and the (r×b+j) column in the expanded first kernel data including 0 (zero) by performing zero padding, and obtain each of the plurality of second kernel elements 650 by changing the arrangement order.

For example, the server may arrange 1, 3, 5; 11, 13, 15; 21, 23, 25 of the first kernel data to 25, 23, 21; 15, 13, 11; 5, 3, 1 to obtain k0 of the second kernel data.

Figure 7A:
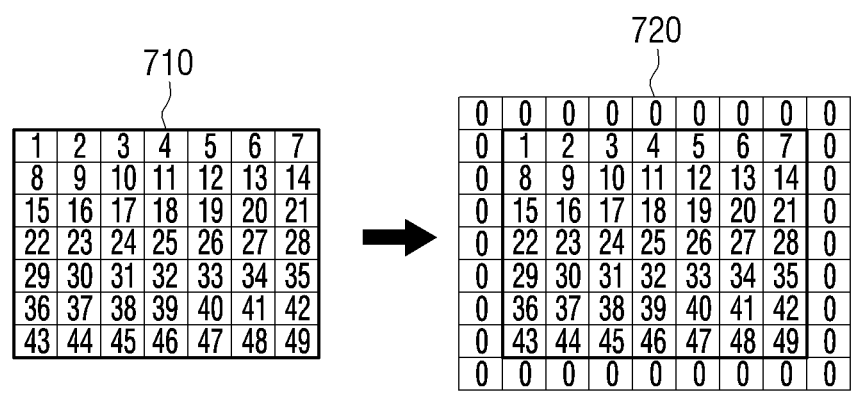
Figure 7B:
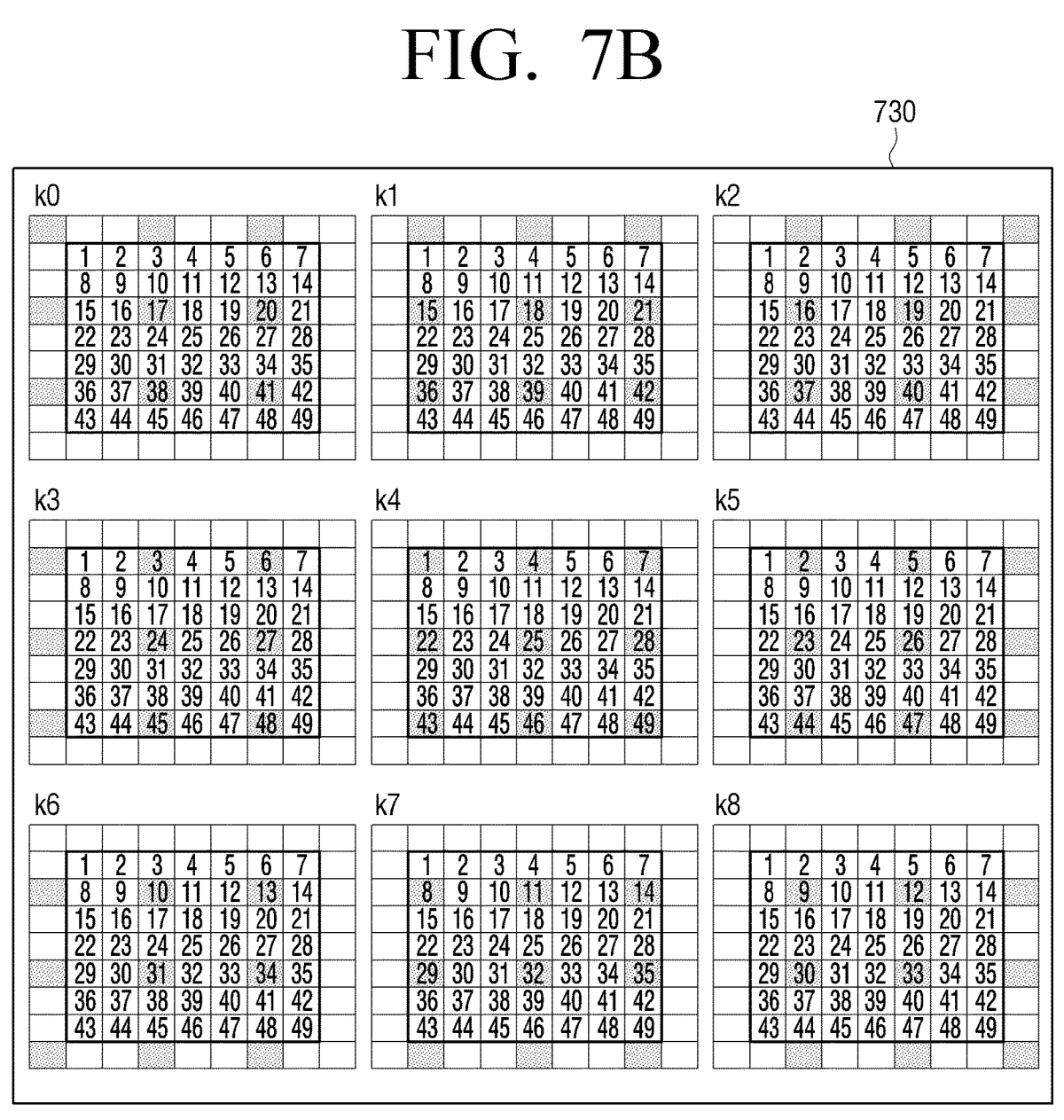
Figure 7C:
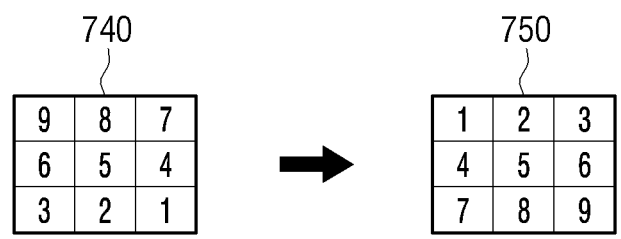

FIGS. 7A to 7C are views illustrating a method of obtaining a plurality of second kernel data according to another embodiment. As shown in a matrix 710 on the left side of FIG. 7A, it will be assumed that first kernel data 710 in a 7×7 matrix formation and the upscaling multiple 3 are applied, according to an embodiment.

Referring to FIG. 7A, the server may expand the first kernel data 710 to obtain expanded first kernel data 720. The server may expand the first kernel data 710 based on the size of the second kernel data and the upscaling multiple (r). The size of the second kernel data may be obtained as shown in FIG. 5, and based on the first equation of FIG. 5 (3<7<=9), the size of the second kernel data may be 3×3.

The server may determine the size of the first kernel data 710 by multiplying the size of the second kernel data by the upscaling multiple. For example, the sever may determine the size of the first kernel data to be 9×9 by multiplying the size of the second kernel data 3 by the upscaling multiple 3.

The server may obtain the expanded first kernel data 720 of 9×9 by performing zero padding of the first kernel data 710 of 7×7 in all directions.

Referring to FIG. 7B, the server may obtain each of the plurality of second kernel data 730 based on the plurality of first kernel elements spaced apart at the interval of the up scaling multiple (r).

For example, the server may obtain k0 of the second kernel data 730 based on 17, 20, 38, and 41 of the first kernel data. The server may obtain k1 of the second kernel data 730 based on 15, 18, 21, 36, 39, and 42 of the first kernel data. Each of the plurality of second kernel data may include a different first kernel element of the plurality of first kernel elements in the first kernel data.

That is, the server may identify each of the plurality of second kernel data as two-dimensional information of (i, j) (where i and j are natural numbers less than or equal to a upscaling multiple (r)), identify the size of the second kernel data based on the size of the first kernel data and the multiple (r), expand the first kernel data based on the size of the second kernel data and the multiple (r), and obtain the second kernel data of (i, j) of the plurality of second kernel data based on the first kernel element located in the (r×a+i) row and the (r×b+j) column of the expanded first kernel data. Here, a and b may be natural numbers of 0 (zero) or more, respectively.

The server may obtain each of the plurality of second kernel elements by changing the arrangement of the first kernel elements, as shown in FIG. 7C. That is, the server may sequentially arrange the first kernel elements 740 located in the (r×a+i) row and the (r×b+j) column in the expanded first kernel data including 0 (zero) by performing zero padding, and obtain each of the plurality of second kernel elements 750 by changing the arrangement order.

As described above, the server may obtain a plurality of second kernel data although the first kernel data and the upscaling multiple (r) are changed.

FIGS. 2A to 7C are views illustrating that the server obtains the plurality of second kernel data from the first kernel data, but the disclosure is not limited thereto. For example, the electronic apparatus 100 may receive the first kernel data from the server, and the processor 120 may obtain the plurality of second kernel data from the first kernel data in the same manner as shown in FIGS. 2A to 7C, according to an embodiment.

Figure 8:
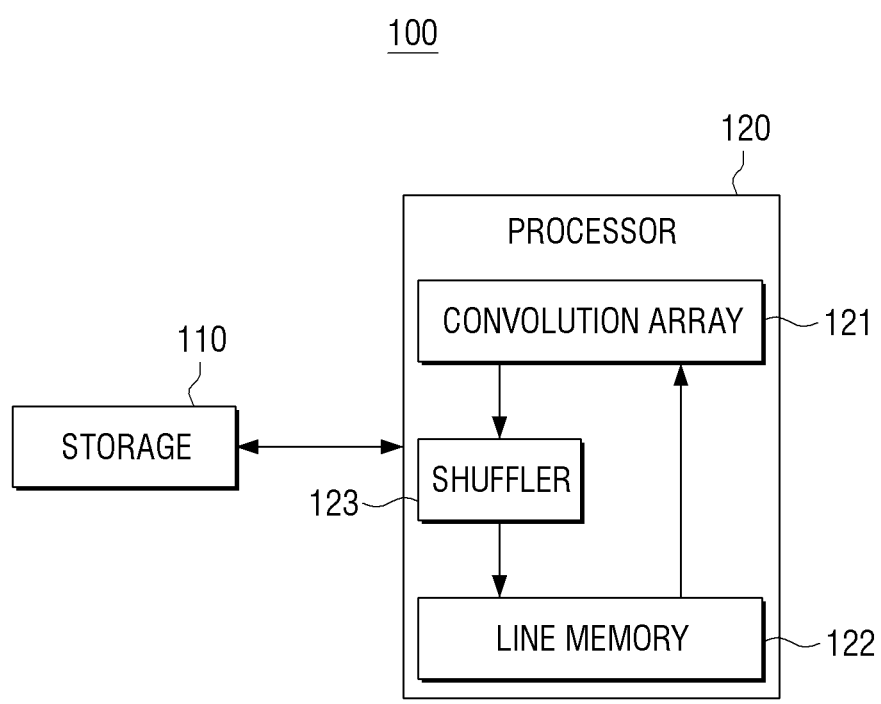
FIG. 8 is a view illustrating an internal structure of a processor according to an embodiment.

FIG. 8 is a view illustrating an internal structure of a processor according to an embodiment.

Referring to FIG. 8, the processor 120 may include a convolution array 121, a line memory 122, and a shuffler 123. The configurations of FIG. 8 are similar to those shown in FIG. 1, according to an embodiment. Thus, the detailed description thereof will be omitted to avoid redundancy.

The convolution array 121 may perform a convolution operation on each of the plurality of second kernel data and the input data 210. The convolution array 121 may receive the input data 210 and each of the plurality of second kernel data from the storage 110. The storage 110 may store the input data 210 and the first kernel data 220, and the processor 120 may read the first kernel element corresponding to the second kernel element required in the current cycle from the storage 110 and provide the first kernel element to the convolution array 121.

The processor 120 may convert the first kernel data 220 stored in the storage 110 into a plurality of second kernel data, and store the plurality of second kernel data in the storage 110. The convolution array 121 may receive the second kernel element required in the current cycle from the storage 110 among the plurality of second kernel data stored in the storage 110.

The convolution array 121 may receive the input data 210 and the second kernel element required in the current cycle from the line memory 122. The line memory 122 may receive the input data 210 and the first kernel data 220 from the storage 110 and store the input data 210 and the first kernel data 220. The line memory 122 may receive the input data 210 and the plurality of second kernel data from the storage 110 and store the input data 210 and the plurality of second kernel data.

The convolution array 121 may accumulate and store the convolution operation results, and further detailed description thereof will be provided below with reference to FIG. 9 according to an embodiment.

The line memory 122 may store upscaling data. The line memory 122 may store the input data 210 and the plurality of second kernel data.

The shuffler 123 may be disposed between the convolution array 121 and the line memory 122. The shuffler 123 may shuffle the operation results output from the convolution array 121 and provide the results to the line memory 122. Further detailed description thereof will be provided below with reference to FIGS. 11A to 11D, according to an embodiment.

Figure 9:
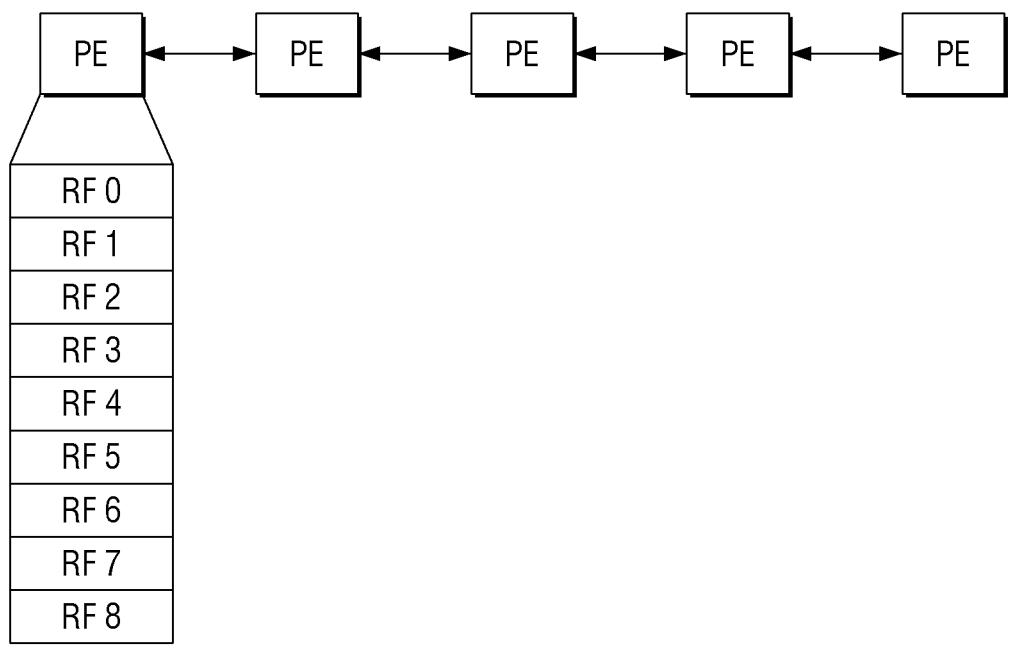
FIG. 9 is a view illustrating a convolution array according to an embodiment.

FIG. 9 is a view illustrating a convolution array 121 according to an embodiment.

Referring to FIG. 9, the convolution array 121 may include a plurality of processing elements respectively including a plurality of register files.

Each of the processing elements may basically include a multiplier and an arithmetic logic unit (ALU), and the ALU may include at least one adder. The processing element may perform arithmetic operations using a multiplier and an ALU. However, the disclosure is not limited thereto, and any other structure may be used as long as it can perform functions such as arithmetic operation and shift operation.

Each processing element may include a plurality of register files. For example, each processing element may include nine register files (RF), as shown in FIG. 9 according to an embodiment.

Each processing element may store the operation result in a specific cycle in one of the plurality of register files. Each processing element may shift the operation result in the specific cycle to a neighboring processing element, and include an additional register for storing the shifted operation result from the neighboring processing element.

Each of the plurality of processing elements may perform a multiplying operation by using the second kernel element input to the plurality of processing elements of the plurality of second kernel data, and accumulate and store the operation result in a register file corresponding to the second kernel element of the plurality of register files.

For example, a plurality of processing elements may receive five elements in the first row of the input data 210 of 5×5 in FIG. 2. The plurality of processing elements may sequentially receive the second kernel elements from one of the plurality of second kernel data and perform a convolution operation.

Each of the plurality of processing elements may store the operation result in the register file corresponding to the second kernel element. For example, nine register files respectively included in the plurality of processing elements may respectively correspond to the second kernel data from k0 to k8, and when the second kernel element in the second kernel data of k0 is used for the operation, each of the plurality of processing elements may store the operation result in the register file corresponding to the second kernel data of k0. Accordingly, the operation results may be identified although the second kernel element included in the second kernel data other than k0 is used.

Referring to FIG. 8, since the convolution operation method of the ID convolution array 121 is a well-known technique, the detailed description will be omitted. The number of register files respectively included in the plurality of processing elements is expressed as an example, but the number could vary.

The convolution array 121 may perform a parallel operation through the plurality of processing elements, and adjust the order of data output accordingly.

Figure 10A:
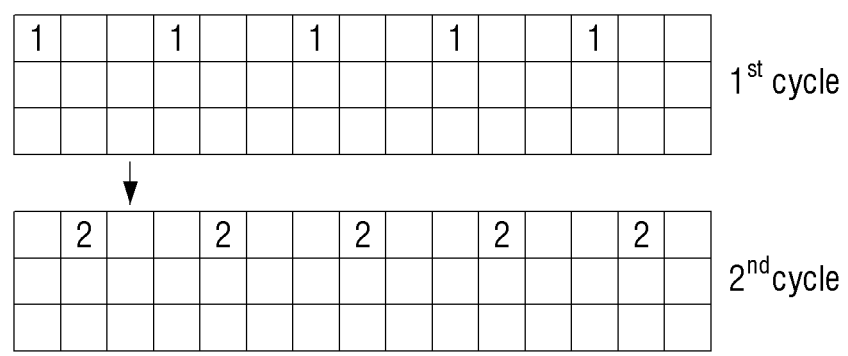
FIGS. 10A and 10B are views illustrating a shuffling method of output data according to an embodiment.
Figure 10B:
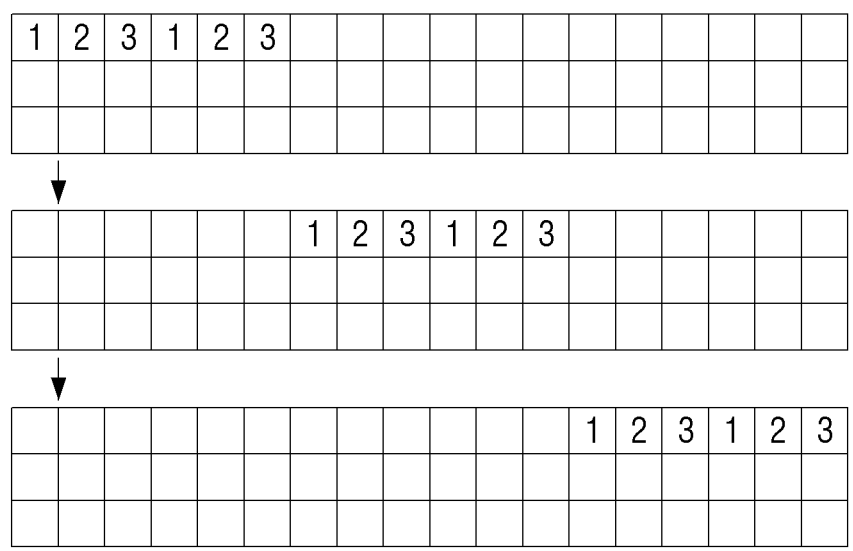

FIGS. 10A and 10B are views illustrating a shuffling method of output data according to an embodiment.

As shown in a first cycle depicted in FIG. 10A, the plurality of processing elements may output 5 parallel operation results by the second kernel data of k0. Referring to the second cycle depicted in FIG. 10A, the plurality of processing elements may output 5 operation results by the second kernel data. The first cycle shown in FIG. 10A refers to a cycle until the convolution operation by one second kernel data is completed.

As described above, five parallel processing elements by the second kernel data of k0 may be output according to the parallel operation, and when stored in the line memory 122 as it is, an error may occur in upscaling.

Therefore, the output data according to a parallel operation may be stored in the line memory 122 in the order shown in FIG. 10B, and such shuffling operation may be performed by the shuffler 123. FIG. 10B illustrates that the size of the parallel operation performed by the processor 120 is 6 (six).

FIGS. 11A to 11D are views illustrating a shuffling operation according to an embodiment.

Figure 11A:
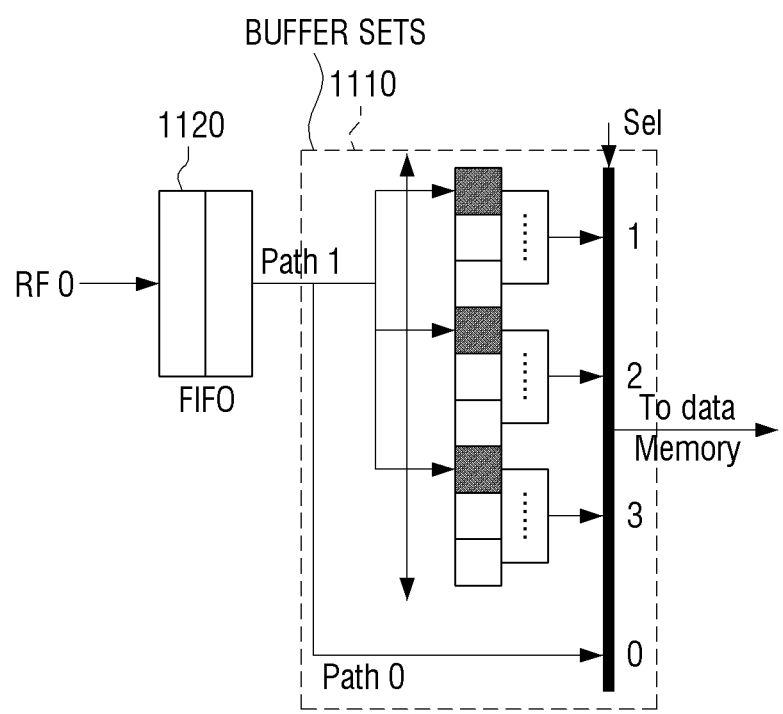
FIGS. 11A to 11D are views illustrating a shuffling operation according to an embodiment.

Referring to FIG. 11A, the shuffler 123 may receive a plurality of operation results output from the register files respectively corresponding to each other included in a plurality of buffer sets 1110 and a plurality of processing elements, and include a FIFO memory 1120 that outputs the plurality of processing elements to the plurality of buffer sets 1110.

Figure 11B:
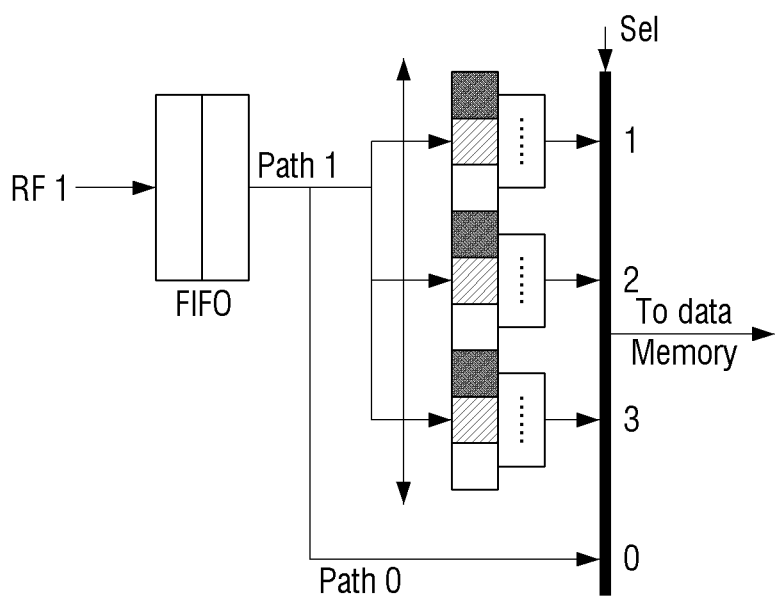

The plurality of buffer sets 1110 may store each of the plurality of operation results in a buffer corresponding to each of the plurality of buffer sets. For example, the plurality of buffer sets may store the plurality of operation results in the first buffer of each set, as shown in FIG. 11A. Referring to FIG. 11B, the plurality of buffer sets may store the plurality of processing elements in the second buffer of each set. The plurality of buffer sets may store the plurality of processing elements in the third buffer of each set as shown in FIG. 11C.

The plurality of buffer sets may provide the plurality of operation results stored in one buffer set of the plurality of buffer sets in the pre-stored order when the operation results are stored in all buffers included in the plurality of buffer sets.

Figure 11C:
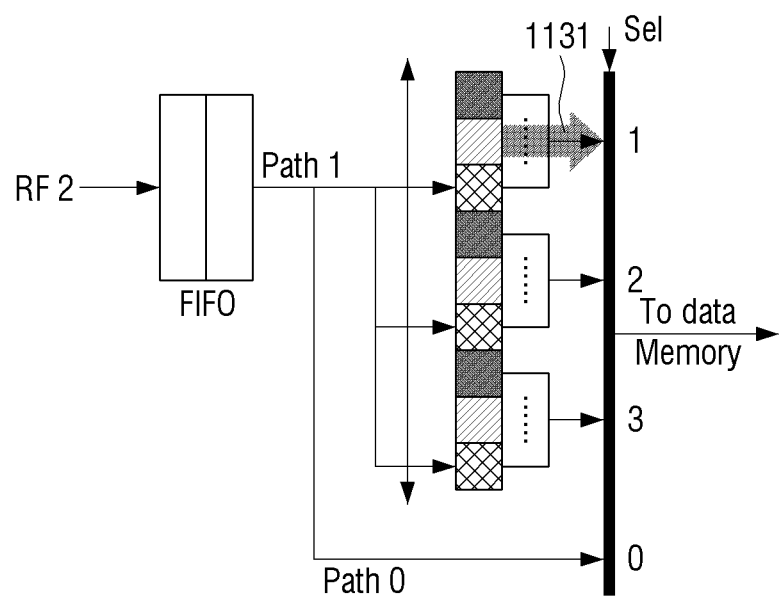
Figure 11D:
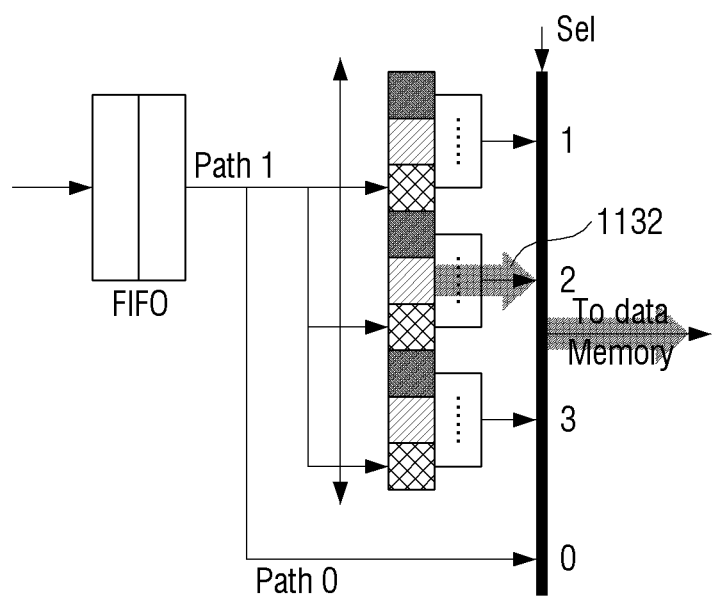

For example, referring to FIG. 11C, the plurality of buffer sets may output 1131 all the data stored in the buffer set disposed at the top of the plurality of buffer sets to the line memory 122. Referring to FIG. 11D, the plurality of buffer sets may output 1132 all the data stored in the buffer set disposed at the center among the plurality of buffer sets to the line memory 122.

The shuffler 123 may shuffle the data output from the convolution array 121 and provide the shuffled data to the line memory 122.

Figure 12:
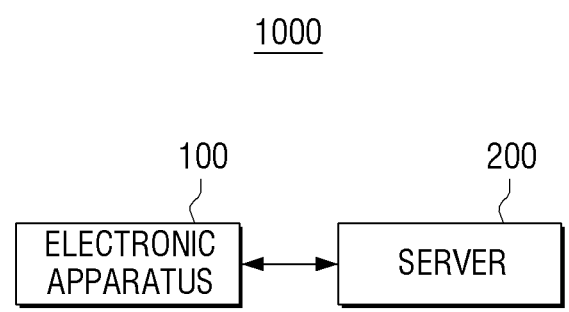
FIG. 12 is a view illustrating an operation of an electronic system according to an embodiment.

FIG. 12 is a view illustrating an operation of an electronic system according to an embodiment.

An electronic system 1000 may include an electronic apparatus 100 and a server 200.

The server 200 may obtain a plurality of second kernel data including a different first kernel element among a plurality of first kernel elements included in first kernel data. To be specific, the server 200 may expand the first kernel data based on the size of the first kernel data and the multiple (r) of upscaling, and obtain each of the plurality of second kernel data based on the plurality of first kernel elements spaced apart at intervals of the multiple (r) in the expanded first kernel data.

The electronic apparatus 100 may receive the second kernel data from the server 200, and perform a convolution operation on each of the plurality of second kernel data with input data and acquire data obtained by upscaling a part of the input data by the first kernel data.

Figure 13:
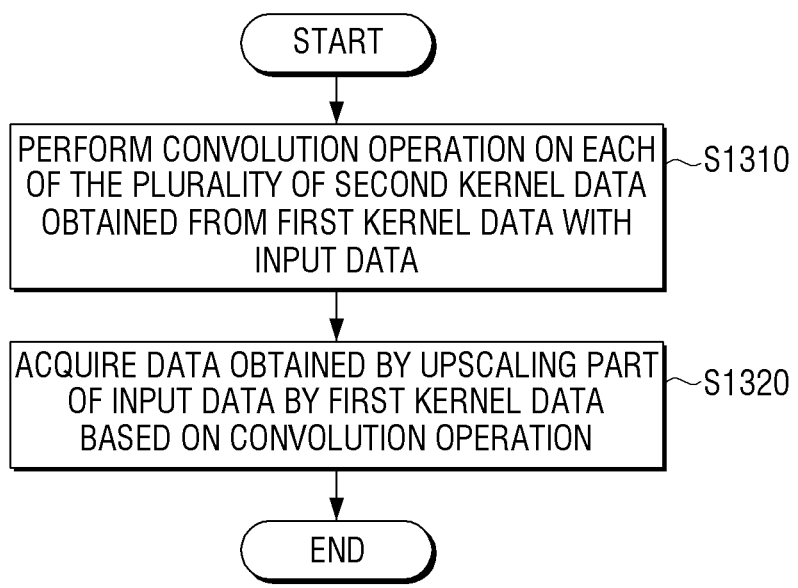
FIG. 13 is a flowchart illustrating a method for controlling an electronic apparatus according to an embodiment.

FIG. 13 is a flowchart illustrating a method of controlling an electronic apparatus according to an embodiment.

A convolution operation may be performed between each of a plurality of second kernel data obtained from first kernel data and input data, in operation S1310. Based on the convolution operation, the data in which a part of the input data is upscaled by the first kernel data may be acquired, in operation S1320.

Each of the plurality of second kernel data may be obtained from an expanded first kernel data based on the size of the first kernel data and a multiple (r) of the upscaling. The expanded first kernel data is obtained by expanding the first kernel data based on a size of the first kernel data and the multiple (r).

The operation of receiving the plurality of second kernel data from the server may further be included.

The operation of receiving the first kernel data from the server and the operation of obtaining the plurality of second kernel data from the first kernel data may further be included.

The operation of obtaining the upscaled data in operation S1320 may include performing a convolution operation on each of the plurality of second kernel data and an element to be upscaled and a plurality of peripheral elements surrounding the element to be upscaled in a part of the input data and obtaining a plurality of upscaling elements with respect to the element to be upscaled, and the sum of the element to be upscaled and the plurality of peripheral elements may be the same as the sum of the plurality of second elements respectively included in the plurality of second kernel data.

The operation of obtaining the upscaled data S1320 may include determining the plurality of upscaling elements with respect to the upscaled data based on the position of the element to be upscaled with respect to the input data.

The operation of obtaining the upscaled data S1320 may include performing a convolution operation on each of the plurality of second kernel data and input data through a convolution array, and storing the upscaled data in a line memory.

The convolution array may include a plurality of processing elements respectively including a plurality of register files, and the operation of performing a convolution operation S1310 may include performing a multiplying operation by using a second kernel element input to a plurality of processing elements among the plurality of second kernel data through the respective plurality of processing elements, and accumulating and storing the operation results to the register file corresponding to the second kernel element of the plurality of register files.

The operation of shuffling the plurality of operation results output from the plurality of processing elements through a shuffler disposed between the convolution array and the line memory and providing the operation result to the line memory may further be included.

The operation of providing the operation results to the line memory may include receiving the plurality of operation results output from the respectively corresponding register files included in the plurality of processing elements of an first in first out (FIFO) memory, and outputting the plurality of operation results to the plurality of buffer sets, storing each of the plurality of operation results in a buffer corresponding to each of the plurality of buffer sets, and based on the operation results being stored in all buffers included in the plurality of buffer sets, providing the plurality of operation results stored in one of the plurality of buffer sets to the line memory in a pre-set order.

According to various embodiments, an electronic apparatus may remove additional hardware for performing an upscaling operation by performing an upscaling operation through a convolution array to minimize a hardware area.

As described above, the Gaussian kernel data has been described as the first kernel data, but upscaling may be performed in the same manner even when the first kernel data is not the Gaussian kernel data. For example, the processor may perform upscaling in various manners using such as bilinear, subpixel shuffle, transposed convolution, etc., and in this case, upscaling may be performed through a convolution operation. When using the transposed convolution, upscaling may be performed based on the convolution operation by expanding the transposed convolution in a z direction.

Various embodiment may be embodied as software including one or more instructions stored in machine-readable storage media. The machine may be an apparatus that calls one or more instructions stored in a storage medium and is operable according to the called one or more instructions, including an electronic apparatus in accordance with various embodiments (e.g., an electronic apparatus (A)). When a command is executed by a processor, the processor may perform the function corresponding to the command, either directly or under the control of the processor, using other components. The one or more instructions may include a code made by a complier or a code executable by an interpreter. The machine-readable storage medium may be provided in the form of a non-transitory storage medium. The 'non-temporary' means that the storage medium does not include a signal but is tangible, but does not distinguish whether data is stored semi-permanently or temporarily on a storage medium.

According to an embodiment, the method according to various embodiments disclosed herein may be provided in a computer program product. A computer program product may be traded between a seller and a purchaser as a commodity. A computer program product may be distributed in the form of a machine-readable storage medium (e.g., compact disc read only memory (CD-ROM)) or distributed online through an application store (e.g., PlayStore™). In the case of on-line distribution, at least a portion of the computer program product may be temporarily stored, or temporarily created, on a storage medium such as a manufacturer's server, a server of an application store, or a memory of a relay server.

Various embodiments described above may be implemented in a recording medium that can be read by a computer or a similar device using software, hardware, or a combination thereof. In some cases, embodiments described herein may be implemented by a processor itself. According to software implementation, embodiments such as the procedures and functions described herein may be implemented in separate software modules. According to some embodiments, software (e.g., the program) may contain one or more instructions that are stored in a machine (i.e., computer) readable storage medium (i.e., internal memory) or external memory. Each of the software modules may perform one or more of the functions and operations described herein.

The non-transitory computer readable medium refers to a medium that stores data semi-permanently rather than storing data for a very short time, such as a register, a cache, and a memory, and is readable by an apparatus. Specifically, the above-described various applications or programs may be stored in a non-transitory computer readable medium such as a compact disc (CD), a digital versatile disk (DVD), a hard disk, a Blu-ray disk, a universal serial bus (USB) memory stick, a memory card, and a read only memory (ROM), and may be provided.

Each of the components (e.g., modules or programs) according to various embodiments may consist of a single entity or a plurality of entities, and some subcomponents of the abovementioned subcomponents may be omitted, or other components may further be included in various embodiments. Alternatively or additionally, some components (e.g., modules or programs) may be integrated into one entity to perform the same or similar functions performed by each component prior to integration. Operations performed by modules, programs, or other components, in accordance with various embodiments, may be executed sequentially, in parallel, repetitively, or heuristically, or at least some operations may be performed in a different order, or omitted, or another function may be further added.

Although embodiments have been shown and described, it will be appreciated by those skilled in the art that changes may be made to these embodiments without departing from the principles and spirit of the disclosure. Accordingly, the scope of the disclosure is not construed as being limited to the described embodiments, but is defined by the appended claims as well as their equivalents.

What is claimed is:
1. An electronic apparatus comprising:
   a memory comprising circuitry and configured to store input data and a plurality of second kernel data obtained from first kernel data such that each of the plurality of second kernel data comprises a different first kernel element from among a plurality of first kernel elements in the first kernel data; and a processor comprising circuitry and configured to perform a convolution operation on each of the plurality of second kernel data with the input data, shuffle the performed convolution operation and obtain upscaled data in which at least a portion of the input data is upscaled by the first kernel data based on the plurality of shuffled operation results, wherein the processor is configured to divide the plurality of first kernel elements in the first kernel data into a plurality of groups, add zeros to each of the plurality of groups based on at least one first kernel element included in each of the plurality of groups so that each of the plurality of groups includes a predetermined number of second kernel elements, and obtain the plurality of second kernel data based on the plurality of groups having the zeros, wherein a size of each of the plurality of second kernel data is determined based on a size of the first kernel data, and wherein the processor comprises:
a convolution array comprising circuitry and configured to perform the convolution operation on each of the plurality of second kernel data with the input data by performing a parallel operation through a plurality of processing elements,
a line memory comprising circuitry and configured to store the upscaled data, and
a shuffler comprising circuitry and positioned between the convolution array and the line memory and configured to shuffle a plurality of operation results output from the convolution array and output the plurality of shuffled operation results to the line memory.

2. The electronic apparatus as claimed in claim 1, wherein each of the plurality of second kernel data is obtained from an expanded first kernel data based on the plurality of first kernel elements spaced apart at intervals of a multiple (r) of upscaling, where r is a natural number, and
wherein the expanded first kernel data is obtained by expanding the first kernel data based on a size of the first kernel data and the multiple (r).

3. The electronic apparatus as claimed in claim 1, further comprising:
a communicator comprising circuitry,
wherein the processor is further configured to receive the first kernel data from a server via the communicator, obtain the plurality of second kernel data from the received first kernel data, and control the memory to store the plurality of second kernel data.

4. The electronic apparatus as claimed in claim 1, wherein the processor is further configured to perform the convolution operation on each of the plurality of second kernel data with an element to be upscaled and a plurality of peripheral elements that surround the element to be upscaled in the portion of the input data, to obtain a plurality of upscaling elements with respect to the element to be upscaled,
wherein a first sum of the element to be upscaled and the plurality of peripheral elements is the same as a second sum of a plurality of second elements respectively included in the plurality of second kernel data.

5. The electronic apparatus as claimed in claim 4, wherein the processor is further configured to determine positions of the plurality of upscaling elements with respect to the element to be upscaled based on a position of the element to be upscaled with respect to the input data.

6. The electronic apparatus as claimed in claim 1, wherein the convolution array comprises the plurality of processing elements respectively including a plurality of register files, and
wherein each of the plurality of processing elements performs a multiplying operation of a second kernel element input to the plurality of processing elements, from among the plurality of second kernel data, and accumulates and stores a result of the multiplying operation in a register file corresponding to the second kernel element from among the plurality of register files.

7. The electronic apparatus as claimed in claim 6, wherein the shuffler comprises:
a plurality of buffer sets comprising circuitry; and
a first in first out (FIFO) memory comprising circuitry and which receives at least two processing elements from among the plurality of processing elements, output from corresponding register files from among the plurality of register files, and outputs the plurality of operation results to the plurality of buffer sets,
wherein the plurality of buffer sets store each of the plurality of operation results in a buffer corresponding to each of the plurality of buffer sets, and
wherein, based on the plurality of operation results being stored in all buffers included in the plurality of buffer sets, outputs the plurality of processing elements stored in one of the plurality of buffer sets to the line memory in a pre-set order.

8. An electronic system, comprising:
a server which obtains a plurality of second kernel data comprising different first kernel elements of a plurality of first kernel elements in first kernel data; and
an electronic apparatus comprising circuitry and configured to receive the second kernel data from the server, perform a convolution operation on each of the plurality of second kernel data with input data, shuffle the performed convolution operation, obtain upscaled data in which at least a portion of the input data is upscaled by the first kernel data based on the plurality of shuffled operation results,
wherein the server is configured to divide the plurality of first kernel elements in the first kernel data into a plurality of groups, add zeros to each of the plurality of groups based on at least one first kernel element included in each of the plurality of groups so that each of the plurality of groups includes a predetermined number of second kernel elements, and obtain the plurality of second kernel data based on the plurality of groups having the zeros,
wherein a size of each of the plurality of second kernel data is determined based on a size of the first kernel data, and
wherein the electronic apparatus comprises:
a convolution array comprising circuitry and configured to perform the convolution operation on each of the plurality of second kernel data with the input data by performing a parallel operation through a plurality of processing elements,
a line memory comprising circuitry and configured to store the upscaled data, and
a shuffler comprising circuitry and positioned between the convolution array and the line memory and configured to shuffle a plurality of operation results output from the convolution array and output the plurality of shuffled operation results to the line memory.

9. The electronic system as claimed in claim 8, wherein the server expands the first kernel data based on a size of the first kernel data and a multiple (r) of upscaling, where r is a natural number, and obtains each of the plurality of second kernel data based on the plurality of first kernel elements spaced apart at intervals of the multiple (r) in the expanded first kernel data.

10. A method of controlling an electronic apparatus, the method comprising:
dividing, by a processor comprising circuitry, a plurality of first kernel elements in first kernel data into a plurality of groups, adding, by the processor, zeros to each of the plurality of groups based on at least one first kernel element included in each of the plurality of groups so that each of the plurality of groups includes a predetermined number of second kernel elements, and obtaining, by the processor, a plurality of second kernel data based on the plurality of groups having the added zeros, wherein the processor comprises a convolution array, a line memory and a shuffler positioned between the convolution array and the line memory;
performing, by the convolution array of the processor, a convolution operation on each of the plurality of second kernel data obtained from the first kernel data with input data by performing a parallel operation through a plurality of processing elements such that each of the plurality of second kernel data comprises a different first kernel element from among the plurality of first kernel elements in the first kernel data;
shuffling, by the shuffler of the processor, the performed convolution operation; and
obtaining, by the processor, upscaled data in which at least a portion of the input data is upscaled by the first kernel data based on the plurality of shuffled operation results,
wherein a size of each of the plurality of second kernel data is determined based on a size of the first kernel data,
wherein the shuffling comprises shuffling a plurality of operation results output from the convolution array and outputting the plurality of shuffled operation results to the line memory, and
wherein the obtaining of the upscaled data comprises storing the upscaled data in the line memory.

11. The method as claimed in claim 10, further comprising:
obtaining each of the plurality of second kernel data from an expanded first kernel data based on the plurality of first kernel elements spaced apart at intervals of a multiple (r) of upscaling, where r is a natural number, and
wherein the expanded first kernel data is obtained by expanding the first kernel data based on a size of the first kernel data and the multiple (r).

12. The method as claimed in claim 10, further comprising:
receiving the first kernel data from a server.

13. The method as claimed in claim 10, wherein the obtaining of the upscaled data comprises:
performing the convolution operation on each of the plurality of second kernel data with an element to be upscaled and a plurality of peripheral elements that surround the element to be upscaled in the portion of the input data; and
obtaining a plurality of upscaling elements with respect to the element to be upscaled,
wherein a first sum of the element to be upscaled and the plurality of peripheral elements is the same as a second sum of a plurality of second elements included in the plurality of second kernel data.

14. The method as claimed in claim 13, wherein the obtaining of the plurality of upscaling elements comprises determining positions of the plurality of upscaling elements with respect to the upscaled data based on a position of the element to be upscaled with respect to the input data.

15. The method as claimed in claim 10, wherein the convolution array comprises the plurality of processing elements respectively including a plurality of register files, and
wherein the performing of the convolution operation comprises:
performing a multiplying operation of a second kernel element from among the plurality of second kernel data input into the plurality of processing elements; and
accumulating and storing a plurality of operation results in a register file corresponding to the second kernel element from among the plurality of register files,
wherein the plurality of operation results are obtained based on the performed multiplying operation.

* * * * *